United States Patent
Ogawara

(10) Patent No.: US 9,976,430 B2
(45) Date of Patent: May 22, 2018

(54) BLADE IN FAN, AND FAN

(71) Applicant: IHI Corporation, Koto-ku (JP)

(72) Inventor: Kazuto Ogawara, Tokyo (JP)

(73) Assignee: IHI Corporation, Koto-ku (JP)

( * ) Notice: Subject to any disclaimer, the term of this patent is extended or adjusted under 35 U.S.C. 154(b) by 296 days.

(21) Appl. No.: 14/924,229

(22) Filed: Oct. 27, 2015

(65) Prior Publication Data

US 2016/0047256 A1 Feb. 18, 2016

Related U.S. Application Data

(63) Continuation of application No. PCT/JP2014/064574, filed on Jun. 2, 2014.

(30) Foreign Application Priority Data

Jun. 6, 2013 (JP) ................................ 2013-119562

(51) Int. Cl.
*F01D 5/14* (2006.01)
*F01D 9/02* (2006.01)
(Continued)

(52) U.S. Cl.
CPC ............... *F01D 9/02* (2013.01); *F01D 9/041* (2013.01); *F01D 17/105* (2013.01); *F01D 25/162* (2013.01); *F01D 25/24* (2013.01); *F01D 25/246* (2013.01); *F02C 7/20* (2013.01); *F04D 29/541* (2013.01); *F04D 29/542* (2013.01); *F04D 29/644* (2013.01); *F05D 2220/323* (2013.01);
(Continued)

(58) Field of Classification Search
CPC .......... F01D 9/02; F01D 9/041; F01D 17/105; F01D 25/246; F04D 29/541; F05D 2240/80
See application file for complete search history.

(56) References Cited

U.S. PATENT DOCUMENTS 4,594,761 A * 6/1986 Murphy ................. B23P 15/04
29/418
6,131,800 A 10/2000 Fernihough
(Continued)

FOREIGN PATENT DOCUMENTS

FR 2 967 714 A1 5/2012
JP 09-70860 A 3/1997
(Continued)

OTHER PUBLICATIONS

Extended European Search Report dated Jan. 4, 2017 in Patent Application No. 14808079.9.
(Continued)

*Primary Examiner* — Ninh H Nguyen
(74) *Attorney, Agent, or Firm* — Oblon, McClelland, Maier & Neustadt, L.L.P.

(57) ABSTRACT

A platform of a fan outlet guide blade has a first rib and a second rib in an opposite surface of a flow passage surface thereof. The first rib and the second rib are formed in portions excluding a predetermined area separated to an upstream side and a downstream side by 8 to 30% of an inter-flange distance between a first flange and a second flange with respect to an axial center of the platform, the portions being located on a pressure surface side in the opposite surface.

11 Claims, 5 Drawing Sheets

(51) Int. Cl.

| | | |
|---|---|---|
| *F01D 9/04* | (2006.01) | |
| *F04D 29/54* | (2006.01) | |
| *F04D 29/64* | (2006.01) | |
| *F01D 17/10* | (2006.01) | |
| *F01D 25/24* | (2006.01) | |
| *F01D 25/16* | (2006.01) | |
| *F02C 7/20* | (2006.01) | |

(52) U.S. Cl.
CPC ...... *F05D 2240/12* (2013.01); *F05D 2240/80* (2013.01); *Y02T 50/671* (2013.01)

(56) References Cited

U.S. PATENT DOCUMENTS

| | | | |
|---|---|---|---|
| 6,910,860 B2 * | 6/2005 | Glover | F01D 9/042 415/191 |
| 2012/0171025 A1 * | 7/2012 | Tudor | F01D 5/141 415/191 |
| 2013/0121833 A1 | 5/2013 | Lucashu et al. | |
| 2013/0287562 A1 | 10/2013 | Ishigure et al. | |
| 2013/0333350 A1 * | 12/2013 | Stilin | F01D 9/02 60/226.1 |

FOREIGN PATENT DOCUMENTS

| | | |
|---|---|---|
| JP | 2004-324646 A | 11/2004 |
| JP | 2005-325839 A | 11/2005 |
| JP | 2008-163950 A | 7/2008 |
| JP | 2008-82337 A | 10/2008 |
| JP | 2011-85055 A | 4/2011 |
| JP | 2011-196179 A | 10/2011 |
| JP | 2012-72750 A | 4/2012 |
| WO | WO 2012/121334 A1 | 9/2012 |

OTHER PUBLICATIONS

International Search Report dated Aug. 12, 2014 for PCT/JP2014/064574 filed on Jun. 2, 2014 with English Translation.
Written Opinion dated Aug. 12, 2014 for PCT/JP2014/064574 filed on Jun. 2, 2014.

* cited by examiner

BLADE IN FAN, AND FAN

CROSS REFERENCE TO RELATED APPLICATIONS

This application is a continuation application of International Application No. PCT/JP2014/064574, filed on Jun. 2, 2014, which claims priority to Japanese Patent Application No. 2013-119562, filed on Jun. 6, 2013, the entire contents of which are incorporated by references herein.

BACKGROUND

1. Field

The present disclosure relates to a fan in an aircraft engine, and a blade used in the fan, such as a fan outlet guide blade.

2. Description of the Related Art

In recent years, various developments of a fan outlet guide blade (a fan stator vane), which is a component of a fan, have been performed (refer to Japanese Patent Laid-Open Publication Nos. 2011-196179 and 2008-82337).

The fan outlet guide blade includes a guide blade body as a blade body. The guide blade body has a pressure surface (a positive pressure surface) on one side in a blade thickness direction, and has a suction surface (a negative pressure surface) on the other side in the blade thickness direction. In addition, a platform is formed at a base end (an inner end in a radial direction) of the guide blade body. The platform has a flow passage surface of air outside in the radial direction. Additionally, a first flange that can be fastened to a part of a cylindrical fan frame in an aircraft engine is formed on an upstream end side (one end side in an axial direction) in an opposite surface of the flow passage surface of the platform, and a second flange that can be fastened to another part of the fan frame is formed on a downstream end side (the other end side in the axial direction) in the opposite surface of the flow passage surface of the platform. Further, a first connection piece that can be fastened to a part of a fan case in the aircraft engine is formed on a leading edge side (an upstream end side) in a tip (an outer end in the radial direction) of the guide blade body, and a second connection piece that can be fastened to a part of the fan case is formed on a trailing edge side (a downstream end side) in the tip of the guide blade body.

SUMMARY

A diameter of the fan tends to be larger by request for a higher bypass ratio for the purpose of improvement in fuel consumption of the aircraft engine, and along with that, not only a length in the radial direction of the fan outlet guide blade, but an axial length (a length in the axial direction) of the fan outlet guide blade extend. Therefore, rigidity of the platform becomes low, a natural vibration frequency of the platform in a primary vibration mode decreases, and it becomes difficult to secure vibration strength of the platform in a high level. Meanwhile, although it is also considered that ribs for reinforcing the platform are continuously formed on the opposite surface (an inner surface in the radial direction) of the flow passage surface of the platform from the upstream end side to the downstream end side of the platform via an axial center of the platform to thereby enhance the rigidity of the platform, weight of the outlet guide blade increases, and thus reduction in weight of the fan, i.e., reduction in weight of the aircraft engine becomes difficult.

That is, there is a problem that it is difficult to secure the vibration strength of the platform in the high level, while promoting the reduction in weight of the aircraft engine.

Consequently, an object of the present disclosure is to provide a fan in an aircraft engine and a blade used in the fan that can solve the above-mentioned problem.

A first aspect of the present disclosure is a blade used in a fan in an aircraft engine, the blade including: a blade body having a pressure surface on one side in a blade thickness direction, and a suction surface on the other side in the blade thickness direction; and a platform formed at a base end (an inner end in a radial direction) of the blade body, including a flow passage surface of air outside in the radial direction, in which a first flange is formed on an upstream end side (one end side in an axial direction) in an opposite surface (an inner surface in the radial direction) of the flow passage surface of the platform, a second flange is formed on a downstream end side (an other end side in the axial direction) in the opposite surface of the flow passage surface of the platform, a first rib for reinforcing the platform is formed in at least either of a portion of the pressure surface side (one side in a blade thickness direction) and a portion of the suction surface side (the other side in the blade thickness direction) in the opposite surface of the flow passage surface of the platform, the first rib extends toward an upstream end (one end in the axial direction) of the platform from a first position separated to an upstream side (one side in the axial direction) by 8 to 30% of an inter-flange distance between the first flange and the second flange (an interval distance in the axial direction between the first flange and the second flange) with respect to an axial center of the platform, a second rib for reinforcing the platform is formed in the at least either portion in the opposite surface of the flow passage surface of the platform, and in which the second rib extends toward a downstream end (the other end in the axial direction) of the platform from a second position separated to a downstream side (the other side in the axial direction) by 8 to 30% of the inter-flange distance with respect to the axial center of the platform.

Note that a "blade in a fan" means including a fan outlet guide blade and a fan rotor blade in the specification and claims of the present application. In addition, an "axial direction" means a direction serving as an axial direction of the fan in a state of using the blade for the fan, and a "radial direction" means a direction serving as a radial direction of the fan in the state of using the blade for the fan.

A second aspect of the present disclosure is a fan that takes air into an annular core flow passage formed inside a cylindrical core cowl in an aircraft engine, and a bypass flow passage formed between an inner peripheral surface of a cylindrical fan case arranged outside the core cowl and an outer peripheral surface of the core cowl, the fan including the blade in the fan according to the first aspect.

According to the present disclosure, since a natural vibration frequency of the platform in a primary vibration mode can be more sufficiently increased than a case where the ribs are continuously formed from the upstream end side to the downstream end side of the platform via the axial center of the platform, vibration strength of the platform can be secured in a high level, while reducing weight of the blade in the fan to thereby promote reduction in weight of the fan, i.e., reduction in weight of the aircraft engine.

DESCRIPTION OF THE EMBODIMENTS

The present disclosure is based on the following knowledge obtained by the inventor of the present application.

Figure 4A:
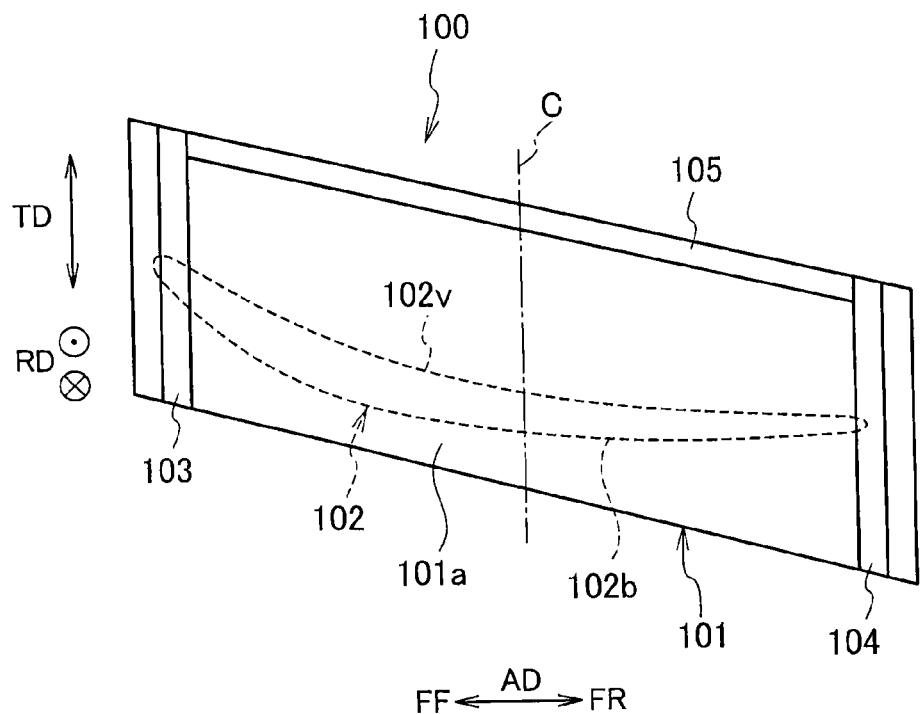
FIG. 4A is a view showing an opposite surface side of a flow passage surface of a platform of a fan outlet guide blade according to a comparative example.
Figure 4B:
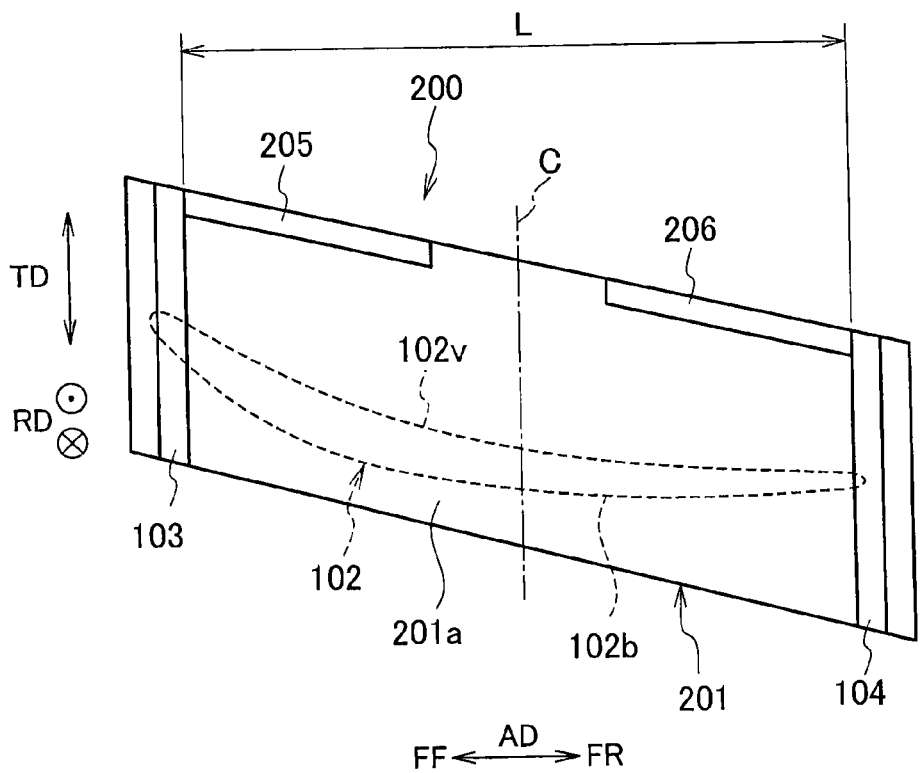
FIG. 4B is a view showing the opposite surface side of the flow passage surface of a platform of the fan outlet guide blade according to an example of the present disclosure.
Figure 5A:
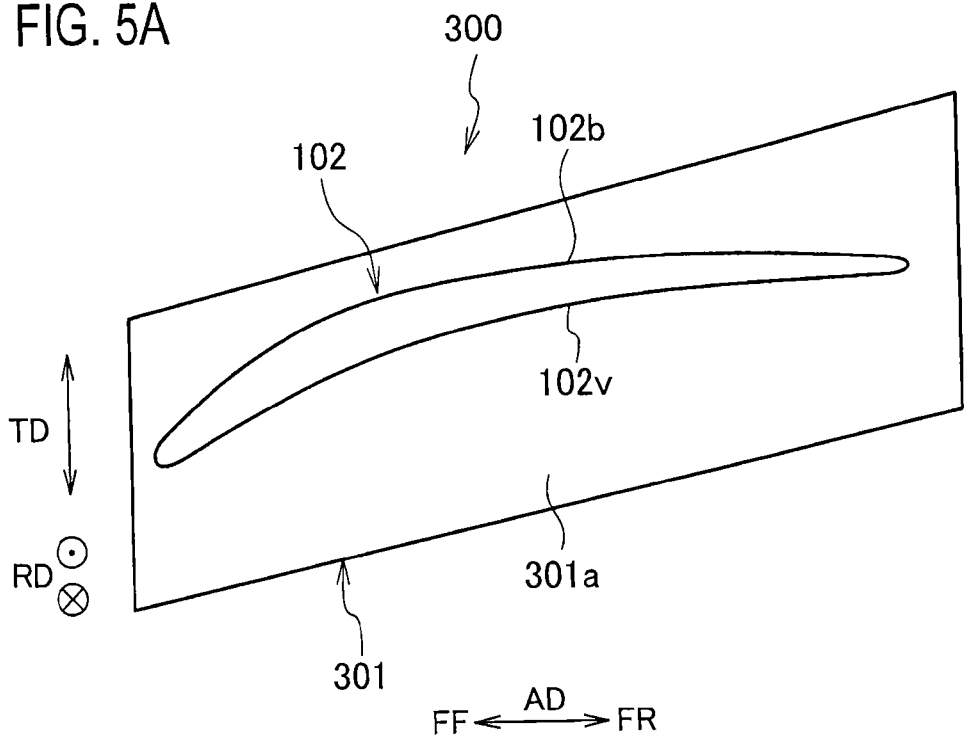
FIG. 5A is a view showing a flow passage surface side of a platform as an analysis object.
Figure 5B:
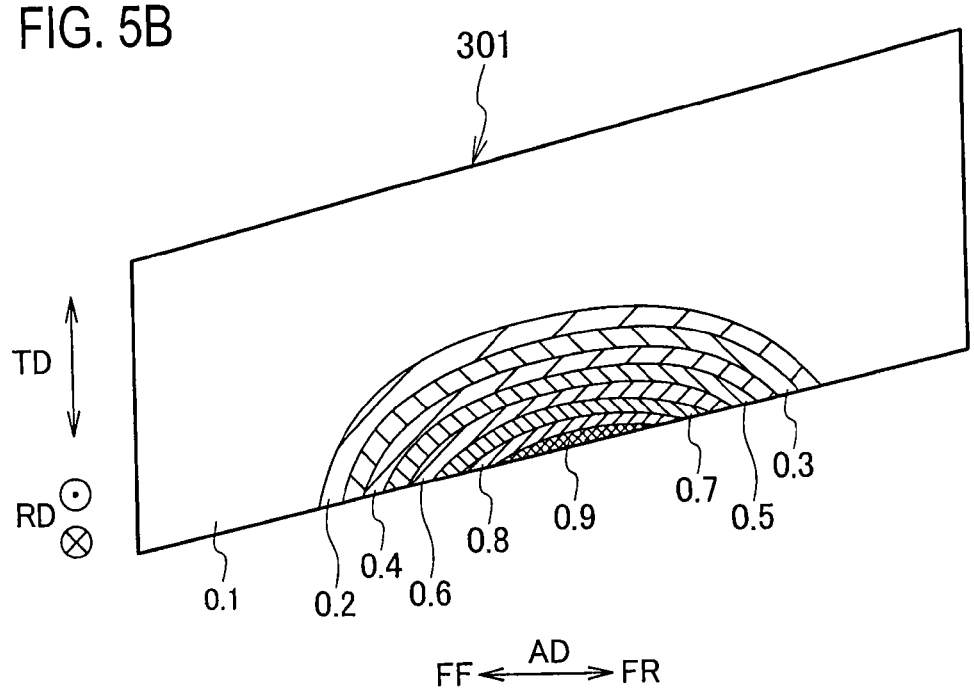
FIG. 5B is a view showing a result of primary vibration mode analysis of displacement of the platform during operation of the aircraft engine.

FIG. 4A is a view showing an opposite surface 101a side of a flow passage surface of a platform 101 of a fan outlet guide blade 100 according to a comparative example. FIG. 4B is a view showing an opposite surface 201a side of a flow passage surface of a platform 201 of a fan outlet guide blade 200 according to an example of the present disclosure. FIG. 5A is a view showing a flow passage surface 301a side of a platform 301 of a fan outlet guide blade 300 as an analysis object. FIG. 5B is a view showing a result (i.e., a primary vibration mode shape) of primary vibration mode analysis of displacement of the platform 301 during operation of an aircraft engine. Note that a same symbol is attached to a same member in these drawings. As shown in FIG. 4A, the fan outlet guide blade 100 according to the comparative example includes a rib 105 in at least either of a portion of a pressure surface 102v side of a guide blade body 102 and a portion of a suction surface 102b side of the guide blade body 102 in the opposite surface 101a of the flow passage surface of the platform 101. The rib 105 is continuously formed from an upstream end (a first flange 103) side of the platform 101 toward a downstream end (a second flange 104) side via an axial center C of the platform 101. Meanwhile, as shown in FIG. 4B, the fan outlet guide blade 200 according to the example of the present disclosure includes two ribs (a first rib 205 and a second rib 206) formed in portions excluding a predetermined area separated to an upstream side and a downstream side by 8 to 30% of an inter-flange distance L between the first flange 103 and the second flange 104 with respect to the axial center C of the platform 201. As a result of having performed eigenvalue analysis of these platforms 101 and 201, it turned out that a natural vibration frequency in a primary vibration mode of the platform 201 according to the example of the present disclosure becomes higher (specifically, it becomes 1.170 times) compared with a natural vibration frequency in the primary vibration mode of the platform 101 according to the comparative example. Here, the predetermined area separated to the upstream side and the downstream side by 8 to 30% of the inter-flange distance L with respect to the axial center C of the platform 201 is the area previously set based on a result of primary vibration mode analysis of displacement of the platform 301 during operation of the aircraft engine, using the platform 301 shown in FIG. 5A of a same shape as the platform 101 and the platform 201 as an analysis object. In addition, the predetermined area corresponds to an area from a position where maximum displacement occurs to a position where 90 to 50% of the maximum displacement occurs during the operation of the aircraft engine. FIG. 5B shows the result of the primary vibration mode analysis of the displacement of the platform 301 during the operation of the aircraft engine. Numerical values in FIG. 5B are non-dimensional values of a displacement amount of the platform 301, setting a maximum displacement amount of the platform 301 to be 1.0, and a position of the maximum displacement amount (a position of a displacement amount 1.0) lies in an area of 0.9, although illustration is omitted.

Note that in FIGS. 4A to 5B, "FF" denotes a front direction (an upstream direction), "FR" a rear direction (a downstream direction), "AD" an axial direction, "RD" a radial direction, and "TD" a blade thickness direction, respectively. In addition, operation of the aircraft engine means a series of behavior of the aircraft engine from take-off to landing.

Next, one embodiment of the present disclosure will be explained with reference to FIGS. 1 to 3. Note that also in FIGS. 1 to 3, "FF" denotes the front direction (upstream direction), "FR" the rear direction (downstream direction), "AD" the axial direction, "RD" the radial direction, and "TD" the blade thickness direction, respectively.

Figure 3:
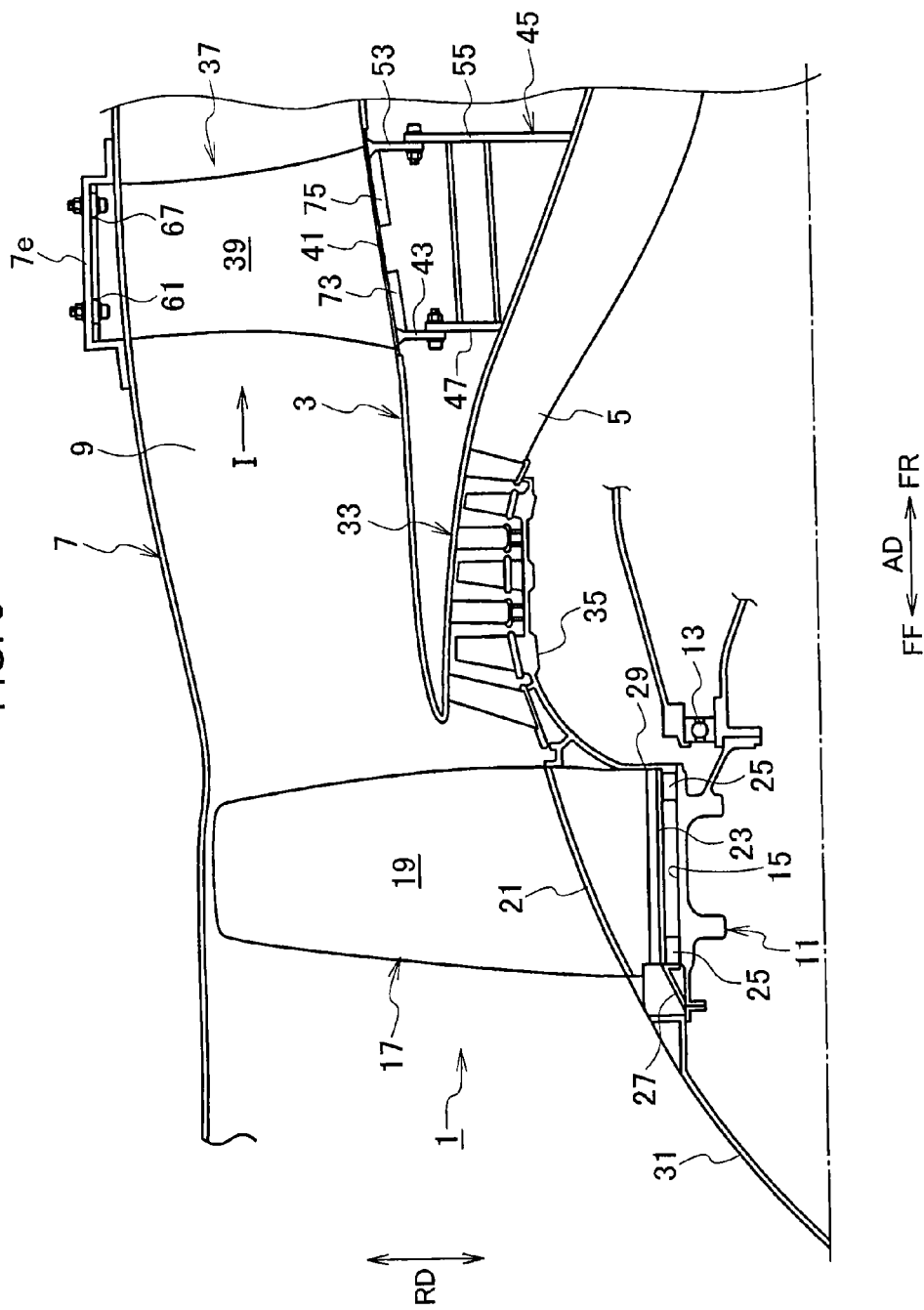
FIG. 3 is a half side sectional view of a front side portion of an aircraft engine including the fan according to the embodiment of the present disclosure.

As shown in FIG. 3, a fan 1 according to the embodiment takes air into an annular core flow passage 5 formed inside a cylindrical core cowl 3 in the aircraft engine, and a bypass flow passage 9 formed between an inner peripheral surface of a cylindrical fan case 7 arranged outside the core cowl 3 and an outer peripheral surface of the core cowl 3.

A fan disk 11 is rotatably provided at a front portion of the core cowl 3 through a bearing 13 etc. The fan disk 11 is coupled coaxially and integrally with low-pressure turbine rotors of a plurality of stages (illustration is omitted) of a low-pressure turbine (illustration is omitted) arranged behind the fan 1. In addition, a plurality of fitting grooves (fitting notches) 15 is formed at regular intervals in an outer peripheral surface of the fan disk 11.

A fan rotor blade 17 is fittingly provided in each fitting groove 15 of the fan disk 11. Each fan rotor blade 17 includes: a rotor blade body 19 as a blade body; a platform 21 formed at a base end (an inner end in the radial direction) of the rotor blade body 19; and a dovetail 23 that is formed inside in the radial direction of the platform 21, and can be fitted in the fitting groove 15 of the fan disk 11. In addition, a plurality of spacers 25 is provided between a bottom surface of each fitting groove 15 of the fan disk 11 and the dovetail 23 of each fan rotor blade 17. An annular front retainer 27 that holds the plurality of fan rotor blades 17 is provided integrally at a front side (upstream side) of the fan disk 11. An annular rear retainer 29 that holds the plurality of fan rotor blades 17 is provided integrally at a rear side (downstream side) of the fan disk 11. The front retainer 27 is coupled integrally with a nose cone 31 that guides the air. The rear retainer 29 is coupled coaxially and integrally with a low-pressure compressor rotor 35 in a low-pressure compressor 33 arranged at a rear side of the fan 1.

A plurality of fan outlet guide blades 37 that rectify a flow of the air is provided at regular intervals in a circumferential direction, on a downstream side of the fan rotor blade 17 between the core cowl 3 and the fan case 7.

Figure 1:
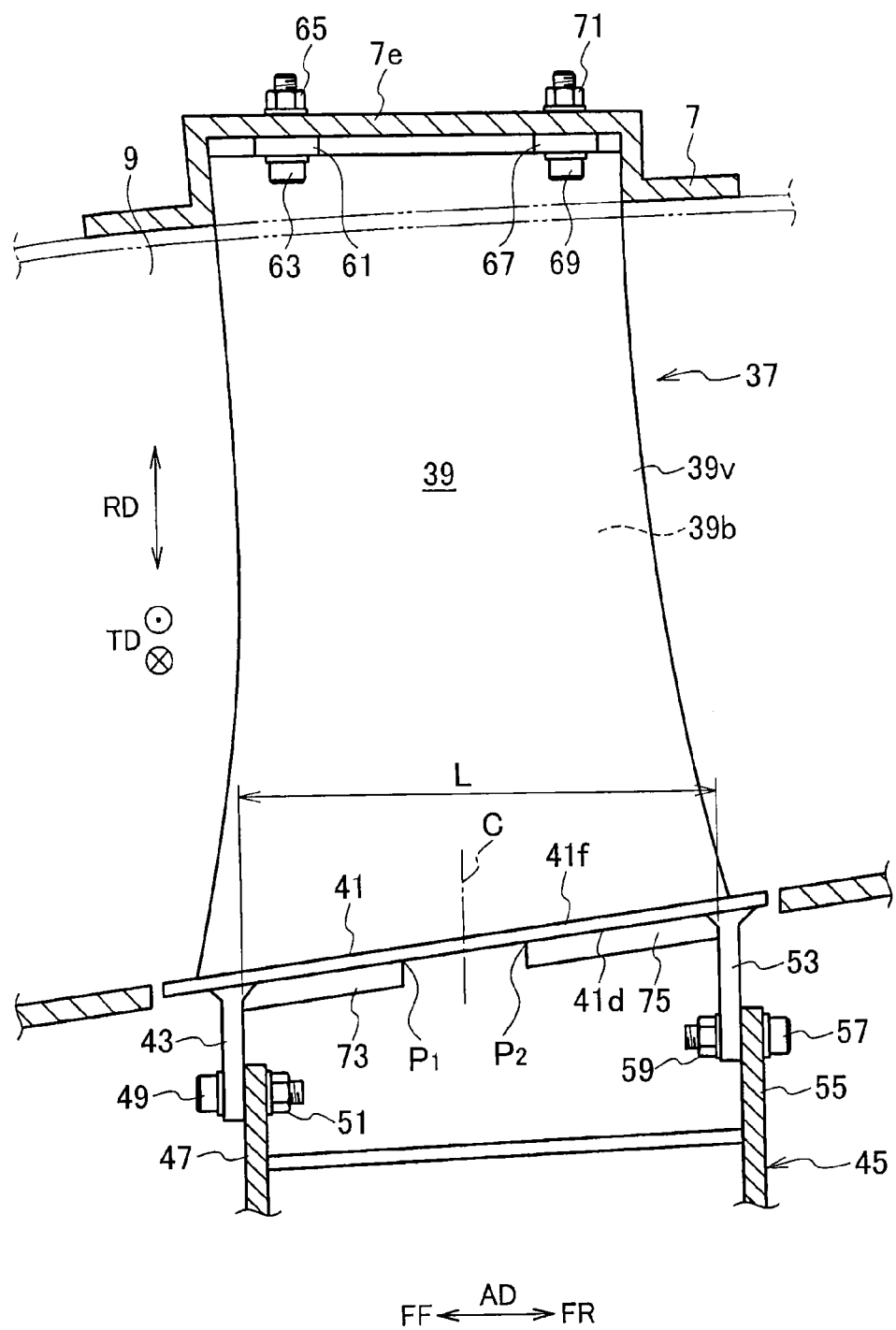
FIG. 1 is an enlarged view of an arrow portion I in FIG. 3.

As shown in FIGS. 1 and 3, the fan outlet guide blade 37 includes a guide blade body 39 as a blade body. The guide blade body 39 has a pressure surface (a positive pressure surface) 39v located on one side in the blade thickness direction, and has a suction surface (a negative pressure surface) 39b located on the other side in the blade thickness direction. A platform 41 is formed at a base end (an inner end in the radial direction) of the guide blade body 39. The platform 41 has a flow passage surface 41*f* of air outside in the radial direction.

An arc-shaped first flange 43 is formed on an upstream end side (a front end side) in an opposite surface 41*d* of the flow passage surface 41*f* of the platform 41. The first flange 43 is fastened to an annular or an arc-shaped first mating flange 47 formed at an outer peripheral surface of a cylindrical fan frame 45, which is a part of the core cowl 3, by a bolt 49 and a nut 51. An arc-shaped second flange 53 is formed on a downstream end side (a rear end side) in the opposite surface 41*d* of the flow passage surface 41*f* of the platform 41. The second flange 53 is fastened to an annular or an arc-shaped second mating flange 55 formed on a downstream side of the first mating flange 47 in the outer peripheral surface of the fan frame 45 by a bolt 57 and a nut 59.

A first connection piece 61 is formed on a leading edge side (an upstream end side) in a tip (an outer end in the radial direction) of the guide blade body 39. The first connection piece 61 is fastened to a diameter expansion portion 7*e* of the fan case 7 by a bolt 63 and a nut 65. A second connection piece 67 is formed on a trailing edge side (a downstream end side) in the tip of the guide blade body 39. The second connection piece 67 is fastened to the diameter expansion portion 7*e* of the fan case 7 by a bolt 69 and a nut 71.

Figure 2:
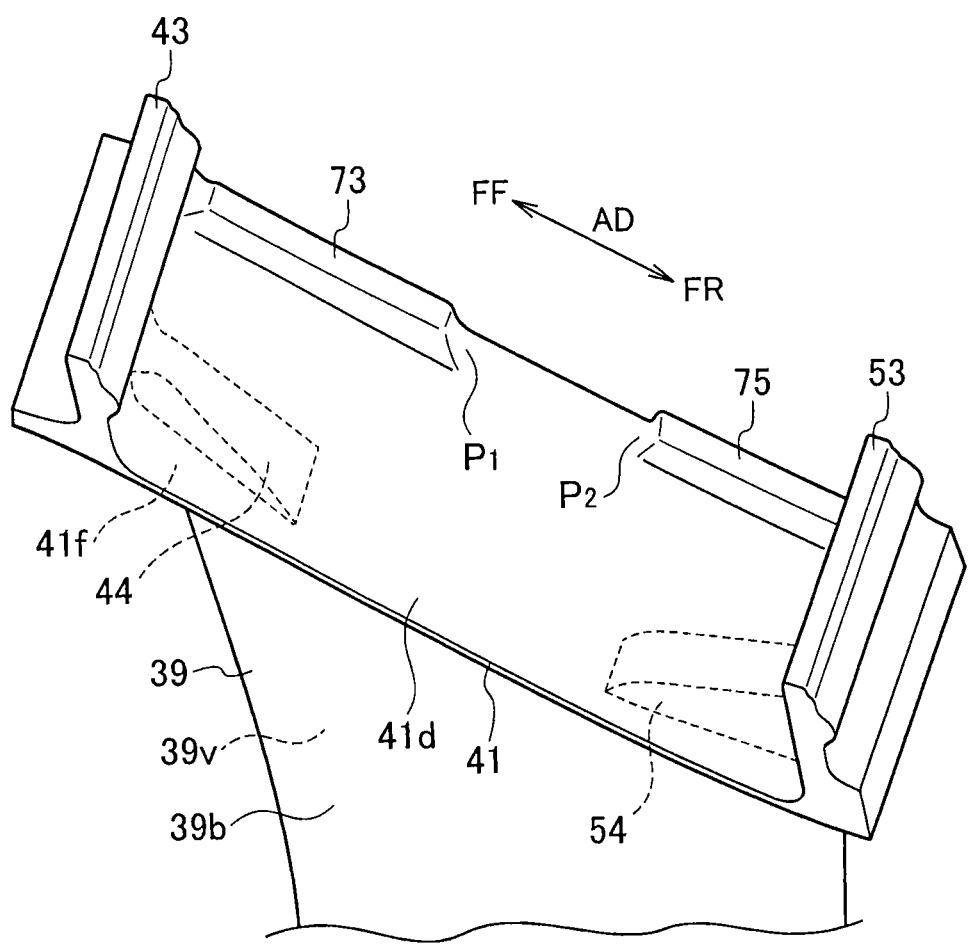
FIG. 2 is a partial perspective view of a fan outlet guide blade according to an embodiment of the present disclosure seen from an opposite surface side of a flow passage surface of a platform.

As shown in FIGS. 1 and 2, a first rib 73 for reinforcing the platform 41 is formed in a portion of the pressure surface 39*v* side (one side in the blade thickness direction) in the opposite surface (inner surface in the radial direction) 41*d* of the flow passage surface 41*f* of the platform 41. The first rib 73 extends toward the first flange 43 from a first position $P_1$ separated to the upstream side (one side in the axial direction) by 8 to 30% of the inter-flange distance L between the first flange 43 and the second flange 53 (an interval distance in the axial direction of the first flange 43 and the second flange 53) with respect to the axial center C of the platform 41. The first rib 73 projects from the platform 41 in a radial direction RD. Note that the first rib 73 may be formed so as to be located only in a region of the platform 41 seen from the radial direction RD. In this case, the first rib 73 can be prevented from interfering with an adjacent platform.

In addition, a second rib 75 for reinforcing the platform 41 is formed in a portion of the pressure surface 39*v* side in the opposite surface 41*d* of the flow passage surface 41*f* of the platform 41. The second rib 75 extends toward the second flange 53 from a second position $P_2$ separated to the downstream side (other side in the axial direction) by 8 to 30% of the inter-flange distance L with respect to the axial center C of the platform 41. Similarly to the first rib 73, the second rib 75 also projects from the platform 41 in the radial direction RD. In addition, the second rib 75 may also be located only in the region of the platform 41 seen from the radial direction RD. In this case, the second rib 75 can also be prevented from interfering with the adjacent platform.

In other words, the first rib 73 and the second rib 75 are formed in the portions excluding a predetermined area (an area between the first position $P_1$ and the second position $P_2$) separated to the upstream side and the downstream side by 8 to 30% of the inter-flange distance L with respect to the axial center C of the platform 41, the portions being located on the pressure surface 39*v* side in the opposite surface 41*d* of the flow passage surface 41*f* of the platform 41. Here, the predetermined area is the area previously set based on a result of primary vibration mode analysis of displacement of the platform 41 during operation of the aircraft engine, and it corresponds to the area from the position where maximum displacement occurs to a position where 90 to 50% of the maximum displacement occurs during the operation of the aircraft engine. A reason why the first rib 73 and the second rib 75 are formed in the portions excluding the predetermined area is that it becomes impossible to sufficiently increase a natural vibration frequency of the platform 41 in a primary vibration mode when the first rib 73 and the second rib 75 are formed in the predetermined area.

Note that in the embodiment of the present disclosure, although the first rib 73 and the second rib 75 are formed in the portions of the pressure surface 39*v* side in the opposite surface 41*d* of the flow passage surface 41*f* of the platform 41, a positional relation of the guide blade body 39 to the platform 41 is changed, and thereby the first rib 73 and the second rib 75 may be formed in portions of the suction surface 39*b* side (other side in the blade thickness direction) in the opposite surface 41*d* of the flow passage surface 41*f* of the platform 41. In addition, even if the first rib 73 does not extend from the first position $P_1$ toward the first flange 43 (i.e., even if the first rib 73 does not reach the first flange 43), it may just extend from the first position $P_1$ toward the upstream end of the platform 41. Similarly, even if the second rib 75 does not extend from the second position $P_2$ toward the second flange 53 (i.e., even if the second rib 75 does not reach the second flange 53), it may just extend from the second position $P_2$ toward the downstream end of the platform 41.

In addition, as shown by dotted lines in FIG. 2, a reinforcing rib 44 may be provided on corner portions (corners) formed by the platform 41 and the first flange 43, the reinforcing rib 44 being formed integrally with the corner portions. The reinforcing rib 44 is formed in a plate shape perpendicular to the platform 41 and the first flange 43, and is connected to the platform 41 and the first flange 43, in a place of not interfering with the first rib 73 and the second rib 75. The reinforcing rib 44 suppresses distortion of the platform 41 and the first flange 43. Similarly, a reinforcing rib 54 may be provided on corner portions (corners) formed by the platform 41 and the second flange 53, the reinforcing rib 54 being formed integrally with the corner portions. The reinforcing rib 54 is formed in a plate shape perpendicular to the platform 41 and the second flange 53, and is connected to the platform 41 and the second flange 53, in a place of not interfering with the first rib 73 and the second rib 75. The reinforcing rib 54 suppresses distortion of the platform 41 and the second flange 53.

Subsequently, an action and an effect of the embodiment of the present disclosure will be explained.

The plurality of fan rotor blades 17 is rotated integrally with the fan disk 11 by rotating the fan disk 11 by means of operation of the aircraft engine, thereby enabling to take the air into the core flow passage 5 and the bypass flow passage 9. Additionally, a flow of the air taken into the bypass flow passage 9 is rectified by the plurality of fan outlet guide blades 37 (a usual action of the fan 1).

In addition to the usual action of the fan 1, the following effect can be obtained. In the fan outlet guide blade 37, the first rib 73 and the second rib 75 are formed in the portions excluding the predetermined area separated to the upstream side and the downstream side by 8 to 30% of the inter-flange distance L with respect to the axial center C of the platform 41, the portions being located on the pressure surface 39*v* side in the opposite surface 41*d* of the flow passage surface 41*f* of the platform 41. Therefore, when the above-mentioned new knowledge is applied, the natural vibration frequency of the platform 41 in the primary vibration mode can be more sufficiently increased than a case where the ribs are continuously formed from the upstream end side to the downstream end side of the platform 41 via the axial center C of the platform 41 (a case of the fan outlet guide blade according to the comparative example (refer to FIG. 4A).

Accordingly, according to the embodiment of the present disclosure, vibration strength of the platform 41 can be secured in a high level, while reducing weight of the fan outlet guide blade 37 to thereby promote reduction in weight of the fan 1, i.e., reduction in weight of the aircraft engine.

Note that the present invention is not limited to the explanation of the above-mentioned embodiment, and that it can be carried out in various aspects by performing appropriate change, such as applying configurations of the first rib 73 and the second rib 75 in the fan outlet guide blade 37 to the fan rotor blade 17, or the like. In addition, the scope of right encompassed in the present invention is not limited to these embodiments.

What is claimed is:

1. A blade used in a fan in an aircraft engine, comprising:
   a blade body having a pressure surface and a suction surface; and
   a platform formed at a base end of the blade body, including a flow passage surface of air outside in a radial direction, wherein
   the base end of the blade body is located only on a first side in a thickness direction of the blade body on the flow passage surface of the platform,
   a first flange is formed on an upstream end side in an opposite surface of the flow passage surface of the platform, and a second flange is formed on a downstream end side in the opposite surface of the flow passage surface of the platform,
   a first rib for reinforcing the platform is formed only on a second side opposite to the first side in the thickness direction in the opposite surface of the flow passage surface of the platform,
   the first rib extends toward the upstream end of the platform from a first position separated to an upstream side by 8 to 30% of an inter-flange distance between the first flange and the second flange with respect to an axial center of the platform,
   a second rib for reinforcing the platform is formed only on the second side in the thickness direction in the opposite surface of the flow passage surface of the platform, and
   the second rib extends toward the downstream end of the platform from a second position separated to a downstream side by 8 to 30% of the inter-flange distance with respect to the axial center of the platform.

2. The blade according to claim 1, wherein areas in the platform separated to the upstream side and the downstream side by 8 to 30% of the inter-flange distance with respect to the axial center of the platform correspond to an area in the platform from a position where maximum displacement occurs to a position where 90 to 50% of the maximum displacement occurs during operation of the aircraft engine.

3. The blade according to claim 2, wherein
   the first flange is configured to be fastened to a part of a cylindrical fan frame in the aircraft engine,
   the second flange is configured to be fastened to a part of an outer peripheral surface of the fan frame,
   the first rib extends from the first position to the first flange, and
   the second rib extends from the second position to the second flange.

4. A fan that takes air into an annular core flow passage formed inside a cylindrical core cowl in an aircraft engine, and a bypass flow passage formed between an inner peripheral surface of a cylindrical fan case arranged outside the core cowl and an outer peripheral surface of the core cowl, the fan comprising the blade according to claim 3.

5. A fan that takes air into an annular core flow passage formed inside a cylindrical core cowl in an aircraft engine, and a bypass flow passage formed between an inner peripheral surface of a cylindrical fan case arranged outside the core cowl and an outer peripheral surface of the core cowl, the fan comprising the blade according to claim 2.

6. The blade according to claim 1, wherein
   the first flange is configured to be fastened to a part of a cylindrical fan frame in the aircraft engine,
   the second flange is configured to be fastened to a part of an outer peripheral surface of the fan frame,
   the first rib extends from the first position to the first flange, and
   the second rib extends from the second position to the second flange.

7. A fan that takes air into an annular core flow passage formed inside a cylindrical core cowl in an aircraft engine, and a bypass flow passage formed between an inner peripheral surface of a cylindrical fan case arranged outside the core cowl and an outer peripheral surface of the core cowl, the fan comprising the blade according to claim 6.

8. A fan that takes air into an annular core flow passage formed inside a cylindrical core cowl in an aircraft engine, and a bypass flow passage formed between an inner peripheral surface of a cylindrical fan case arranged outside the core cowl and an outer peripheral surface of the core cowl, the fan comprising the blade according to claim 1.

9. The blade in the fan according to claim 1, wherein the first rib does not reach the first flange.

10. The blade in the fan according to claim 1, wherein the second rib does not reach the second flange.

11. The blade in the fan according to claim 1, further comprising at least one of a first reinforcing rib and a second reinforcing rib, the first reinforcing rib being provided on a corner formed by the platform and the first flange and being formed in a plate shape perpendicular to the platform and the first flange, and the second reinforcing rib being provided on a corner formed by the platform and the second flange and being formed in a plate shape perpendicular to the platform and the second flange.

* * * * *